United States Patent
Shen et al.

(10) Patent No.: US 8,467,451 B2
(45) Date of Patent: Jun. 18, 2013

(54) METHODS FOR SELECTING A PREDICTION MODE

(75) Inventors: Chih-Sheng Shen, Jhongli (TW); Chia-Wen Lin, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 1373 days.

(21) Appl. No.: 11/936,779

(22) Filed: Nov. 7, 2007

(65) Prior Publication Data
US 2009/0116549 A1    May 7, 2009

(51) Int. Cl.
*H04N 7/12*    (2006.01)

(52) U.S. Cl.
USPC ................................ 375/240.14; 375/240.24

(58) Field of Classification Search
None
See application file for complete search history.

(56) References Cited

U.S. PATENT DOCUMENTS

| | | | | |
|---|---|---|---|---|
| 5,418,714 | A * | 5/1995 | Sarver | 600/407 |
| 7,376,186 | B2 * | 5/2008 | Boyce et al. | 375/240.15 |
| 7,688,893 | B2 * | 3/2010 | Morimoto et al. | 375/240.12 |
| 7,764,738 | B2 * | 7/2010 | Kim et al. | 375/240.12 |
| 8,019,804 | B2 * | 9/2011 | Po et al. | 708/402 |
| 2003/0231792 | A1 * | 12/2003 | Zhang et al. | 382/154 |
| 2004/0213348 | A1 | 10/2004 | Kim et al. | |
| 2005/0135484 | A1 * | 6/2005 | Lee et al. | 375/240.16 |
| 2006/0002474 | A1 * | 1/2006 | Au et al. | 375/240.16 |
| 2006/0182174 | A1 | 8/2006 | Kuo | |
| 2006/0262983 | A1 | 11/2006 | Cheng et al. | |
| 2007/0183500 | A1 * | 8/2007 | Nagaraj et al. | 375/240.16 |
| 2008/0181308 | A1 * | 7/2008 | Wang et al. | 375/240.16 |
| 2008/0253457 | A1 * | 10/2008 | Moore | 375/240.16 |
| 2010/0054331 | A1 * | 3/2010 | Haddad et al. | 375/240.12 |
| 2010/0074518 | A1 * | 3/2010 | Tanizawa et al. | 382/166 |
| 2010/0309977 | A1 * | 12/2010 | Andersson et al. | 375/240.12 |

OTHER PUBLICATIONS

Kannangara et al. "Computational Control of an H.264 Encoded Through Lagrangian Cost Function Estimation," Int. Workshop *"Very Low Bit-rate Video-Coding,"* Sep. 2005.

\* cited by examiner

*Primary Examiner* — Gregory Sefcheck
(74) *Attorney, Agent, or Firm* — Alston & Bird LLP

(57) ABSTRACT

A method of selecting a number of candidate prediction modes for a block in a video sequence, the method comprising calculating a cost value of each of prediction modes for each of a predetermined number of blocks, identifying one of the prediction modes having the smallest cost value for the each block, calculating a function value of each of the prediction modes for the each block using a cost function, ranking the prediction modes for the each block by the function value of each of the prediction modes and identifying an ordinal value of the one prediction mode having the smallest cost value, the ordinal value being related to the ordinal number of the one prediction mode after the ranking, calculating a feature value of the each block based on the function value of each of the prediction modes related to the each block, identifying a plurality of sets of blocks, each set of blocks having substantially the same feature value, identifying the number of each set of blocks and calculating a sum of the ordinal value of the one prediction mode for the each block in the each set of blocks, calculating an average value of the sum over the number of the each set of blocks for each set of the plurality sets of blocks, and determining a relation between the average values and the feature values for the predetermined number of blocks.

18 Claims, 7 Drawing Sheets

|   |   |   |   |   |
|---|---|---|---|---|
| M | A | B | C | D | E |
| I | a | b | c | d | F |
| J | e | f | g | h | G |
| K | i | j | k | l | H |
| L | m | n | o | p |   |

METHODS FOR SELECTING A PREDICTION MODE

BACKGROUND OF THE INVENTION

The present invention generally relates to video codec and, more particularly, to methods of selecting a prediction mode to code a block in a frame of a video sequence.

Recently, with the evolution of consumer electronics, more and more multimedia-related technologies have been developed and designed for handheld devices, for example, cellular phones. In the handheld device in processing a video sequence, especially in compressing or coding a video sequence in H.264/AVC ("Advanced Video Coding", hereinafter the H.264) format, image quality may be improved if an encoder capable of video compression is designed with relatively high computational complexity. However, the power consumption of the handheld device may also be relatively high, which may not be suitable for a handheld device with limited battery capacity. On the contrary, if an encoder capable of video compression is designed with relatively low computational complexity, even though the power consumption may be relatively low, image quality may be degraded due to loss of information or data during the compression or coding process, which may not satisfy the image quality requirements in the H.264 standard. Hence, video compression may be a trade-off between computational complexity, power consumption and image quality.

An H.264 video sequence encoder may perform an intra prediction for a block of pixels in a video sequence during an intra coding by using spatial domain information. The intra prediction may include an Intra_4×4 prediction and an Intra_16×16 prediction, wherein the Intra_4×4 prediction may comprise nine prediction modes and the Intra_16×16 prediction may comprise four prediction modes. In the H.264 standard, a video frame may be divided into a number of macroblocks, each of which is composed of 16×16 pixels. Furthermore, each of the number of macroblocks may be divided into 4×4 blocks, each of which in turn is composed of 4×4 pixels. Intra coding may use the values of reference pixels near a block to predict the values of pixels in the block. FIG. 1 shows a diagram illustrating an exemplary block 102 to be coded based on an Intra_4×4 prediction. Referring to FIG. 1, the block 102 may be comprised of pixels "a" to "p". The values of the pixels "a" to "p" may be predicted on the basis of partial or all of reference pixels "A" to "M".

In order to achieve optimal coding efficiency, Rate-Distortion Optimization (RDO) may be used to pre-calculate a rate-distortion cost (RD cost) for each of the prediction modes. A prediction mode with the smallest RD cost may be selected as an optimal mode for coding a block. FIG. 2 shows a block diagram illustrating a module 300 for rate-distortion optimization. Referring to FIG. 2, an original block 102 and a prediction block 304 may be fed into the rate-distortion optimization module 300 capable of performing the RDO for the prediction modes and calculating the RD cost in coding the original block for each of the prediction modes. The rate-distortion optimization module 300 may include an integer discrete cosine transform (DCT) module 306, a quantization module 308, an inverse quantization module 310, an inverse integer DCT module 312, a bit-computing module 314, a distortion computing module 318 and an RD cost computing module 316.

Due to computational complexity, the RDO technique may require relatively large computation capacity and in turn relatively high power consumption. It may be desirable to have a method that is able to reduce the computational complexity and power consumption in selecting an optimal prediction mode without compromising video compression quality.

BRIEF SUMMARY OF THE INVENTION

Examples of the present invention may provide a method of selecting a number of candidate prediction modes for a block in a video sequence, the method comprising calculating a cost value of each of prediction modes for each of a predetermined number of blocks, identifying one of the prediction modes having the smallest cost value for the each block, calculating a function value of each of the prediction modes for the each block using a cost function, ranking the prediction modes for the each block by the function value of each of the prediction modes and identifying an ordinal value of the one prediction mode having the smallest cost value, the ordinal value being related to the ordinal number of the one prediction mode after the ranking, calculating a feature value of the each block based on the function value of each of the prediction modes related to the each block, identifying a plurality of sets of blocks, each set of blocks having substantially the same feature value, identifying the number of each set of blocks and calculating a sum of the ordinal value of the one prediction mode for the each block in the each set of blocks, calculating an average value of the sum over the number of the each set of blocks for each set of the plurality sets of blocks, and determining a relation between the average values and the feature values for the predetermined number of blocks.

Some examples of the present invention may also provide a method of selecting a number of candidate prediction modes for a block in a video sequence, the method comprising identifying the number of prediction modes available for rate-distortion optimization (RDO) operations for the video sequence, identifying the number of blocks to be coded in the video sequence, identifying a first frame preceding all the other frames to be coded in the video sequence, allocating a number of prediction modes to each of blocks of the first frame, identifying the number of surplus prediction modes after processing a first block in the first frame, allocating the number of surplus prediction modes to a second block immediately following the first block in the first frame, and identifying the number of first prediction modes for the second block, the number of first prediction modes including the number of prediction modes allocated to the each of blocks of the first frame and the number of surplus prediction modes.

Examples of the present invention may further provide a method of selecting a number of candidate prediction modes for a block in a video sequence, the method comprising identifying a relation between a feature value of a first block and an optimal number of candidate prediction modes for a first video sequence, calculating a function value of each of prediction modes of a second block in a second video sequence using a cost function, calculating a feature value of the second block based on the function value of each of prediction modes of the second block, identifying the number of first candidate prediction modes for the second block based on the relation, identifying a predetermined number of rate-distortion optimization (RDO) operations for the second video sequence, identifying the balance of the predetermined number of RDO operations available for a frame in which the second block in the second video sequence is located, allocating the available RDO operations among blocks in the frame, and identifying whether there are surplus RDO operations after processing a block previous to the second block in the frame of the second video sequence.

Examples of the present invention may further provide an encoder capable of selecting a number of candidate prediction modes for a block in a video sequence, the encoder comprising a first calculator configured to establish a relation between a feature value of a first block in a first video sequence and an optimal number of candidate prediction modes for the first video sequence, and identify the number of first candidate prediction modes for a second block in a second video sequence based on the relation, a second calculator configured to calculate a function value of each of prediction modes of the second block in the second video sequence using a cost function, and a feature value of the second block based on the function value of each of prediction modes of the second block, and a third calculator configured to receive a predetermined number of rate-distortion optimization (RDO) operations for the second video sequence, identify the balance of the predetermined number of RDO operations available for a frame in which the second block in the second video sequence is located, allocate the available RDO operations among blocks in the frame, and identify whether there are surplus RDO operations after processing a block previous to the second block in the frame of the second video sequence.

In one example according to the present invention, the third calculator may be configured to add the number of surplus RDO operations to the number of available RDO operations allocated to the second block to form the number of resultant RDO operations for the second block.

Furthermore, the encoder may further comprise a comparator configured to compare the number of first candidate prediction modes for the second block with the number of resultant RDO operations for the second block to identify the number of candidate prediction modes to perform RDO operations for the second block.

In one example, the cost function may include one of a "sum of absolute differences" (SAD) function, a "sum of absolute transformed differences" (SATD) function, a "sum of squared differences" (SSD) function and a "mean of absolute differences" (MAD) function.

In one example, the first calculator may be configured to calculate a cost value of each of prediction modes for each of a predetermined number of blocks, identify one of the prediction modes having the smallest cost value for the each block, calculate a function value of each of the prediction modes for the each block using the cost function, rank the prediction modes for the each block by the function value of each of the prediction modes and identify an ordinal value of the one prediction mode having the smallest cost value, the ordinal value being related to the ordinal number of the one prediction mode after the ranking.

Moreover, the first calculator may be configured to calculate a feature value of the each block based on the function value of each of the prediction modes related to the each block, identify a plurality of sets of blocks, each set of blocks having substantially the same feature value, identify the number of each set of blocks and calculating a sum of the ordinal value of the one prediction mode for the each block in the each set of blocks, and calculate an average value of the sum over the number of the each set of blocks for each set of the plurality sets of blocks.

In one example, the cost value may include a rate-distortion (RD) cost for performing an RDO operation for the each of the prediction modes.

In one example, the feature value of the each block may be a standard deviation of the function values of the prediction modes related to the each block.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings:

FIG. 1 is a diagram illustrating an exemplary block to be coded based on an Intra_4×4 prediction;

DETAILED DESCRIPTION OF THE INVENTION

Reference will now be made in detail to the present examples of the invention illustrated in the accompanying drawings. Wherever possible, the same reference numbers will be used throughout the drawings to refer to the same or like portions.

In video compression, the encoding of a sequence of frames may include intra-coding and inter-coding. Intra-coding is an encoding process for a single video frame while inter-coding is an encoding process for reconstruction of a video frame using preceding and following frames. Although examples consistent with the present invention as given below are based on the intra-coding process, skilled persons in the art will understand that the examples may be also applicable to the inter-coding process.

In compressing a video sequence of intra-frames (I-frames) in accordance with the H.264 standard, computation complexity may be determined by the number the RDO computations are performed for computing an RD cost of each prediction mode for a 4×4 block of a frame in a video sequence. According to the H.264 standard, all of the nine prediction modes, i.e., mode 0 to mode 8, each of which is associated with a prediction direction, are calculated for every 4×4 block. A candidate prediction mode having the smallest RD cost may then be selected to code the block. In one example according to the present invention, based on a predetermined budget for computation, only a number of "n" candidate modes out of the nine prediction modes are selected to perform the RDO for a block, rather than examining the RDO for all of the nine prediction modes. The predetermined budget for a video sequence may be related to a predetermined number of candidate prediction modes available for the video sequence, and hence may also be related to a predetermined number of RDO operations that may be performed to calculate an RD cost of each of the candidate prediction modes.

Figure 2:
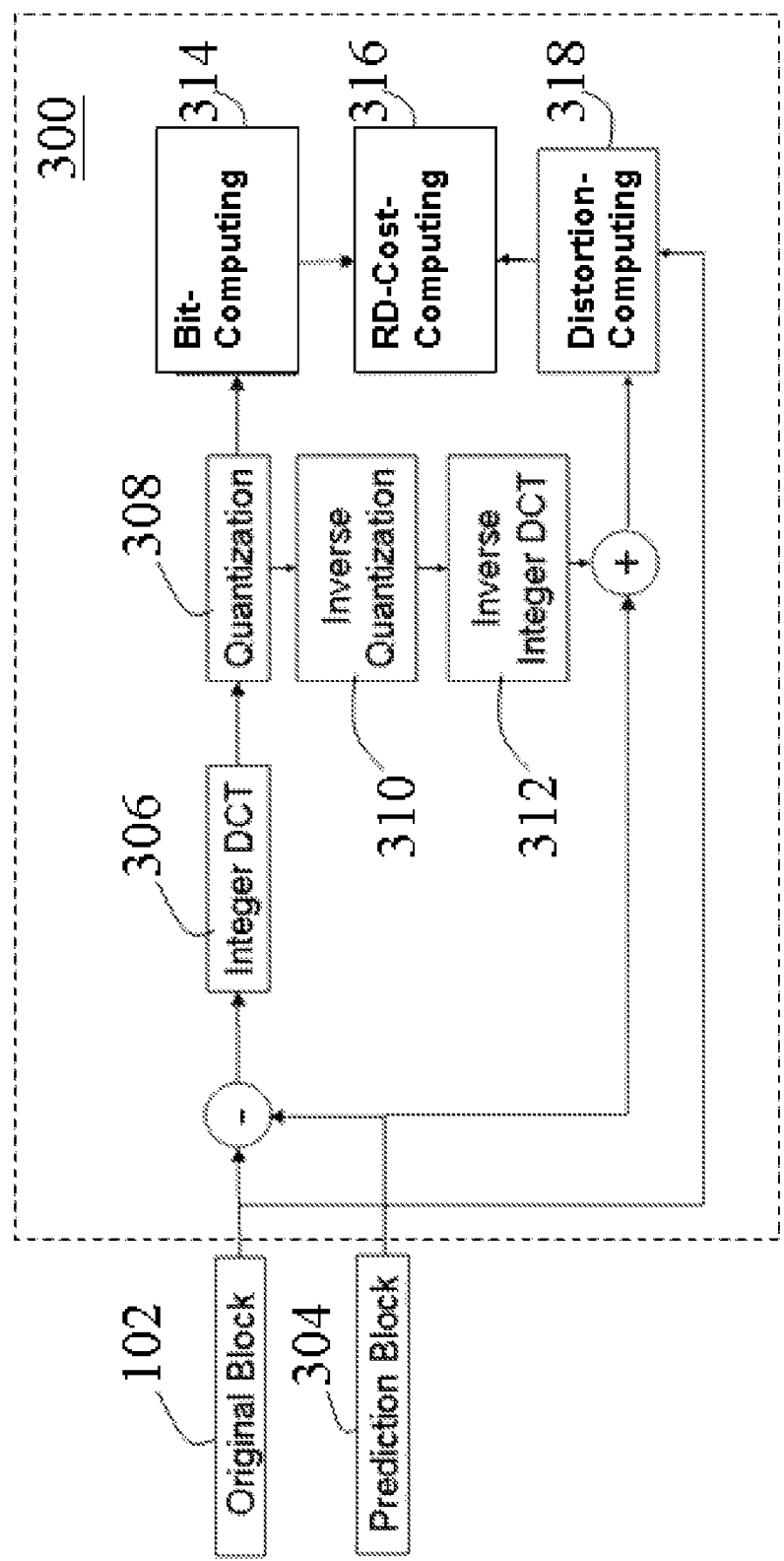
FIG. 2 is a block diagram illustrating a module for rate-distortion optimization.
Figure 3A:
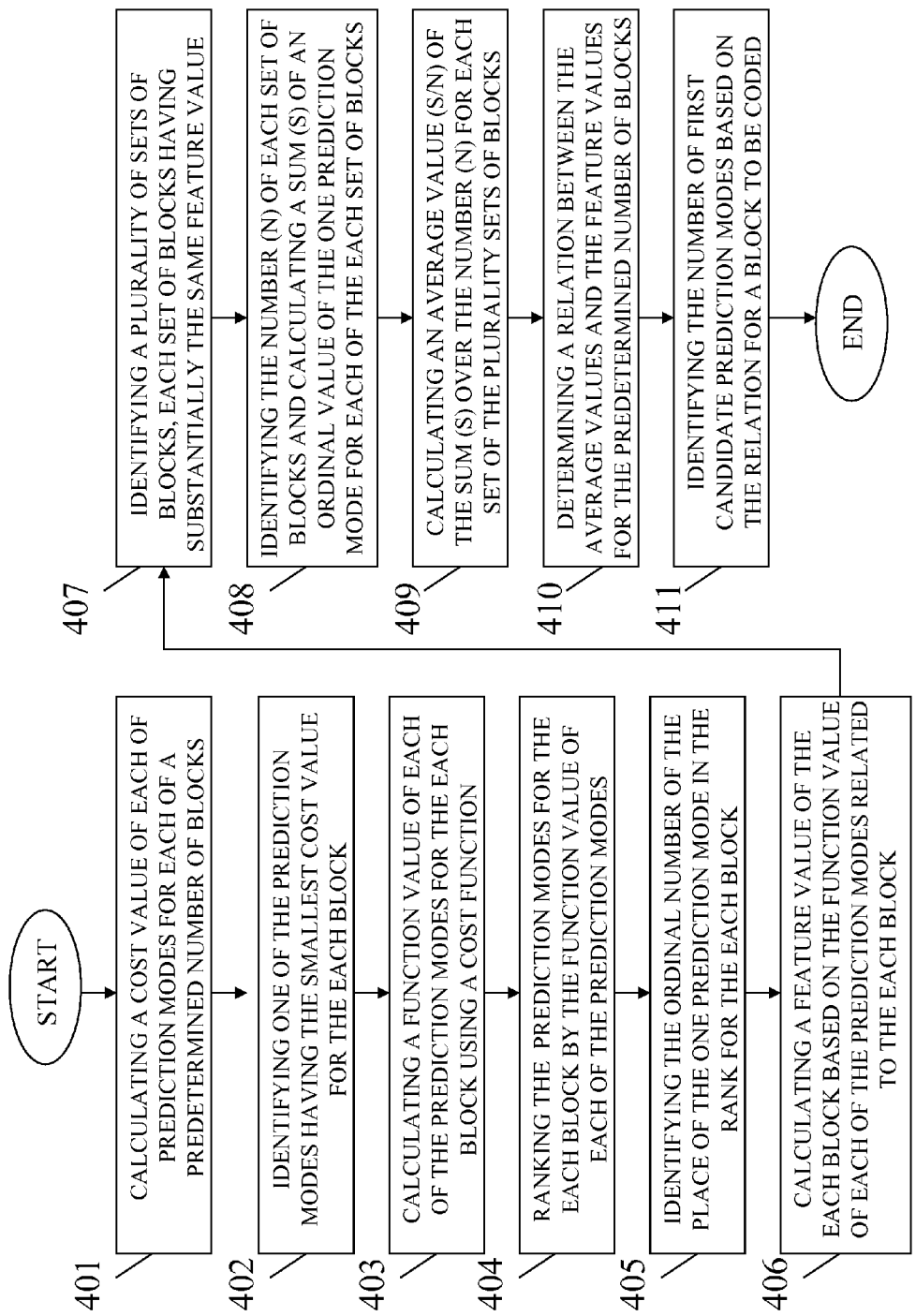
FIG. 3A is a flow diagram illustrating a method of identifying the number of first candidate prediction modes according to an example of the present invention.

FIG. 3A is a flow diagram illustrating a method of identifying the number of first candidate prediction modes for a block according to an example of the present invention. Referring to FIG. 3A, a cost value of each of prediction modes for each of a predetermined number of blocks may be calculated at step 401. The cost value may be related to computational complexity. In one example according to the present invention, the cost value may be the RD cost of a prediction mode when an RDO operation is performed for the prediction mode.

Next, for the each of the predetermined number of blocks, one of the prediction modes that has the smallest cost value may be identified at step 402. Accordingly, each of the predetermined number of blocks has a corresponding prediction mode having the smallest cost value.

At step, 403, a function value of each of the prediction modes for the each of the predetermined number of blocks may be calculated using a cost function. In one example, the cost function may include one of a "sum of absolute differences" (SAD) function, a "sum of absolute transformed differences" (SATD) function, a "sum of squared differences" (SSD) function and a "mean of absolute differences" (MAD) function. For simplicity, examples of the present invention throughout the specification will be described and illustrated on the basis of the SAD function. The function value of each of the prediction modes, $SAD_k$, may be given below.

$$SAD_k = \Sigma\Sigma|P(i,j)-P_k(i,j)|, 0 \leq (i,j) \leq 3$$

wherein $P(i, j)$ and $P_k(i, j)$ represent the pixel intensities of a current block to be coded and a prediction block, respectively, and k is the index of the prediction modes (i.e., $0 \leq k \leq 8$, k being an integer).

At step 404, for the each of the predetermined number of blocks, the prediction modes are ranked by their function values from the smallest to the largest. Next, the ordinal number of the place of the one prediction mode (which is identified at step 402) in the rank for the each of the predetermined number of blocks may be identified at step 405. A prediction mode having the smallest cost value may not necessarily have the smallest function value. For example, a prediction mode having the smallest cost value may rank at a third place when compared among the prediction modes for a block. The ordinal number of the prediction mode is identified as three (3).

At step 406, a feature value of the each of the predetermined number of blocks may be calculated on the basis of the function value of each of the prediction modes related to the each block. In one example consistent with the present invention, the feature value of a block may be a standard deviation of the function values of the prediction modes related to the prediction block. Hence, the feature value of the block, defined as the standard deviation σ, may be calculated as given below.

$$\sigma = \sqrt{\frac{1}{9}\sum_{k=0}^{8}(SAD_k - \overline{SAD})^2},$$

and $$\overline{SAD} = \frac{1}{9}\sum_{k=0}^{8}SAD_k$$

It may be expected that a prediction mode having a smaller function value may be more likely to become a candidate prediction mode. Accordingly, it may be assumed that the one prediction mode and those, if any, rank prior to the one prediction mode may be selected as a set of candidate prediction modes to code a corresponding block. At step 407, the predetermined number of blocks may be sorted according to feature value. A plurality of sets of blocks may be identified, each set of blocks having substantially the same feature value.

At step 408, the number (N) of each set of blocks may be identified. Furthermore, a sum (S) of an ordinal value of the one prediction mode for each of the each set of blocks may be calculated. For instance, given a predetermined number of 1,000 blocks, a first set of blocks, for example, five blocks, may have substantially the same feature value, for example, σ=10, a second set of seven blocks may have substantially the same feature value, for example, σ=15, and so forth. The one prediction mode having the smallest cost value for each of the first set of five blocks may individually rank, for example, the fourth, second, third, first and second place, in a rank according to function value for each of the first set of five blocks. The ordinal values, 4, 2, 3, 1 and 2 of the one prediction modes for the first set of five blocks having substantially the same feature value are then summed.

Next, at step 409, an average value (S/N) of the sum (S) over the number (N) for each set of the plurality of sets of blocks may be calculated. For example, the five ordinal values for the first set of five blocks previously discussed result in a sum of 12, and the average value, S/N, is equal to 2.4 (=12/5), which in one example may mean that a number of "2.4" prediction modes may be selected as the first candidate prediction modes to code a block having a feature value σ=10 i.e., one of the first set of five blocks. The number 2.4 may be rounded to 2 or 3 in actual implementation. Furthermore, other average values for the remaining sets of blocks may also be calculated.

Figure 3B:
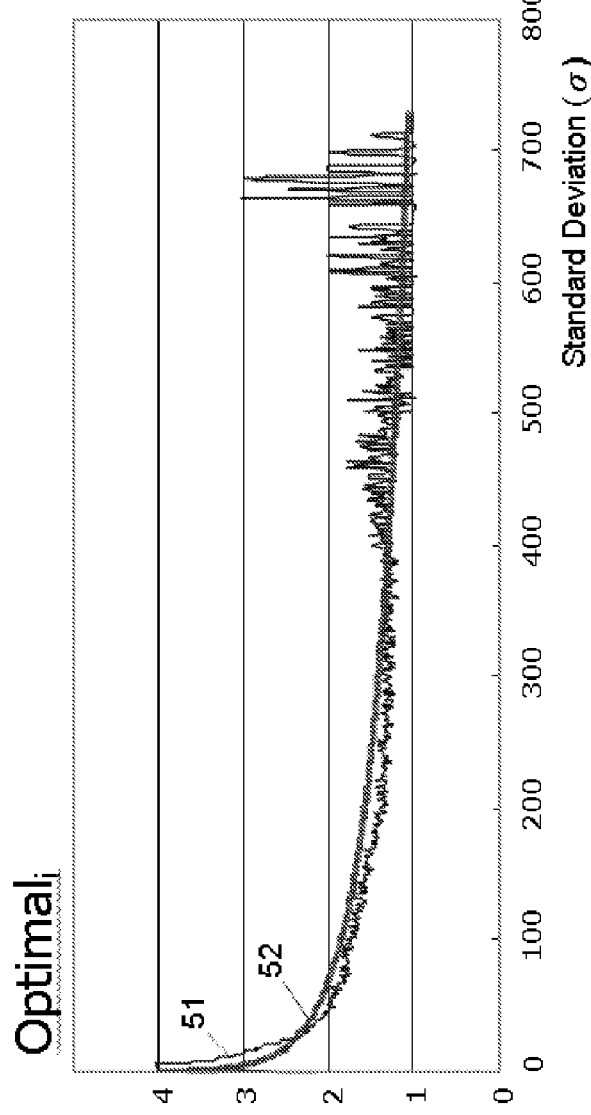
FIG. 3B is a diagram illustrating a relation between average values and feature values of a predetermined number of blocks in accordance with an example of the present invention.

FIG. 3B is a diagram illustrating a relation between average values and feature values of the predetermined number of blocks in accordance with an example of the present invention. Referring to FIG. 3B, the average values, represented in a curve 51, may be distributed over a plurality of feature values ranging from, for example, approximately σ=0 to σ=750. The feature values in one example may be round-off values. The average values at the side portions of the curve 51 may be relatively high or may have an abrupt change because the number of feature values at the side portions is relatively small.

Referring back to FIG. 3A, at step 410, the relation between the average values and features values of the plurality of prediction blocks may be determined. In one example consistent with the present invention, a mathematical model for the distribution of the average values over the feature values may be established by a statistical analysis. Referring also to FIG. 3B, a curve 52 or denoted as $Optimal_i$, which represents the relation between the average values and the feature values, may be obtained by, for example, a regression method. The mathematical model may be expressed below.

$$\begin{cases} Optimal_i = a + b \cdot \sigma & \text{for } \sigma = 0 \\ Optimal_i = c + d \cdot \ln\sigma & \text{for } \sigma > 0 \end{cases}$$

wherein coefficients a, b, c and d may be found by applying the least square method (LSM) as given below $$M = \begin{bmatrix} 1 & \sigma_1 \\ 1 & \sigma_2 \\ \vdots & \vdots \\ 1 & \sigma_n \end{bmatrix} \text{ and } y = \begin{bmatrix} N_1 \\ N_2 \\ \vdots \\ N_n \end{bmatrix} \text{ and } v = \begin{bmatrix} a \\ b \end{bmatrix} \text{ or } \begin{bmatrix} c \\ d \end{bmatrix}$$

$$\Rightarrow v = (M^T M)^{-1} M^T y$$

where $N_1$ to $N_n$ are the average values corresponding to the feature values $\sigma_1$ to $\sigma_n$, respectively. The curves 51 and 52 may be obtained from a Foreman sequence in quarter common intermediate format (QCIF) with quantization parameter (QP) equal to 28 for a number of 300 I-frames.

Figure 3C:
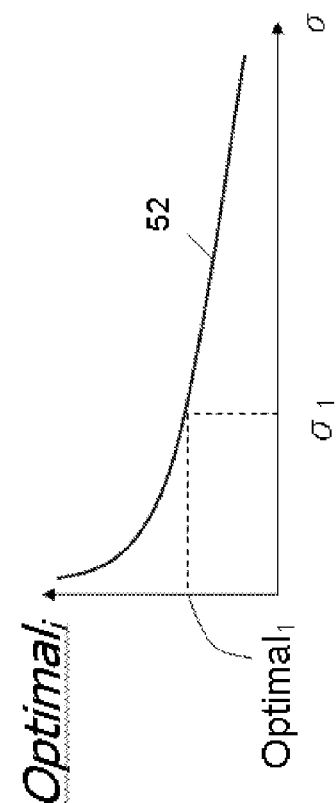
FIG. 3C is a plot illustrating a method of identifying the number of first candidate prediction modes in accordance with an example of the present invention.

In one example according to the present invention, the average value corresponding to a feature value in the curve 52 may be defined as the number of first candidate prediction modes for a block having the feature value. Thus, referring back to FIG. 3A, at step 411, the number of first candidate prediction modes for a block may be identified on the basis of the relation. FIG. 3C is a plot illustrating a method of determining the number of first candidate prediction modes in accordance with an example of the present invention. Referring to FIG. 3C, when a feature value ($\sigma_1$) of a block is identified, the average value (Optimal$_1$) and in turn the number of first candidate prediction modes to perform the RDO operation may be identified.

The predetermined number of blocks at step 401 may function to serve as training blocks to establish the mathematical model. The curve 52 based on the mathematical model may be applicable to blocks in another video sequence. That is, once the relation illustrated in FIG. 3C is established, for a given video sequence, to identify the number of first candidate prediction modes, only the function value of each of prediction modes of a block (step 403 illustrated in FIG. 3A) and the feature value of the block based on the function value (step 406 illustrated in FIG. 3A) need to be calculated, which are relatively simple computation as compared to the RDO operations. The number of first candidate prediction modes, for example, "M", may be identified in accordance with the relation. The first candidate prediction modes for the block may include a number of "M" foremost predication modes in a rank according to function value.

In one example according to the present invention, the number of first candidate prediction modes determined by the mathematical model may be compared with the number of second candidate prediction modes determined by an "allocation model" in order to decide the number of candidate prediction modes to perform the RDO. Specifically, the number of candidate prediction modes may be decided by taking computation resources available for RDO operations into account. According to the allocation model, a predetermined number of RDO operations may be allocated to a video sequence. Furthermore, the number of RDO operations allocated to a frame in the video sequence may depend on the number of balance RDO operations available for the frames to be coded in the video sequence. The allocation model in one example of the present invention may be expressed in equations below.

$$Budget_j = Buffer/C$$

wherein $Budget_j$ may represent the computation resources or the number of RDO operations available for each of blocks of a j-th frame, Buffer may represent the number of balance RDO operations available for frames to be coded in the video sequence, and C may represent the number of blocks to be coded in the video sequence. Given a ratio of 40% of total computation resources for a QCIF sequence with 10 I-frames, the values of C and Buffer may be calculated below.

$$C = 176/4 \times 144/4 \times 10 = 15{,}840 \text{ (blocks)}, \text{ and}$$

$$Buffer = 15{,}840 \times 9 \times 40\% = 57{,}024 \text{ (prediction modes)}$$

The total computation resources may represent the total number of RDO operations required for all of the blocks in a video sequence when all of the prediction modes are examined. The ratio may therefore represent a constraint on the total computation resources. Accordingly, only a predetermined number of RDO operations are available for the blocks in the video sequence. The predetermined number of RDO operations may be related to a predetermined number of prediction modes available for coding the video sequence because the number of RDO operations may be proportional to the number of prediction modes. Furthermore, the number of RDO operations available for an i-th block of the j-th frame may depend on the number of balance RDO operations after processing a (j−1)-th frame located immediately previous to the j-th frame and the number of surplus RDO operations, if any, remained after processing an (i−1)-th block located immediately previous to the i-th block. That is, $$\begin{cases} Budget_i = Budget_j, & \text{if } i = 0 \\ Budget_i = Budget_j + Extra_{i-1} & \text{if } i > 0 \end{cases}$$

wherein $Budget_i$ may represent the number of RDO operations available for the i-th block and $Extra_{i-1}$ may represent the number of surplus RDO operations remained after processing an (i−1)-th block located previous to the i-th block. The value of "$Budget_j$" may be different from frame to frame but may be the same for all of blocks in one frame. Accordingly, the total computation resources allocated to the current i-th block may include a number of "$Budget_j$" RDO operations, which is a constant for all of the blocks in the j-th frame, and a number of "$Extra_{i-1}$" RDO operations remained after processing the previous (i−1)-th block, which is a variable value. From the above equations, a number of "$Budget_j$" RDO operations available for the j-th frame may be allocated to a first block, i.e., the 0-th block (i=0) of the j-th frame. Furthermore, if not all of the allocated RDO operations are used in the first block, the remaining RDO will be added to the computation resources for a following block.

The number of second candidate prediction modes determined by the allocation model is compared with the number of first candidate prediction modes determined by the mathematical model to decide the number of candidate prediction modes for a block. In one example according to the present invention, the comparison may be made in accordance with the rules given below.

If $Optimal_i \le \lfloor Budget_i \rfloor - 1$,            Rule 1
then
$Final_i = \lfloor Budget_i \rfloor$ & $Extra_i = Budget_i - Final_i$ If $\lfloor Budget_i \rfloor - 1 < Optimal_i \le Budget_i$,     Rule 2
then
$Final_i = \lfloor Optimal_i \rfloor$ & $Extra_i = Budget_i - Final_i$ If $Budget_i < Optimal_i \le \lceil Budget_i \rceil + 1$,      Rule 3
then
$Final_i = \lfloor Optimal_i \rfloor$ & $Extra_i = 0$ If $Optimal_i > \lceil Budget_i \rceil + 1$,              Rule 4
then
$Final_i = \lceil Budget_i \rceil$ & $Extra_i = 0$ wherein $Optimal_i$ and $Budget_i$ may represent the number of first and second candidate prediction modes for a block determined by the mathematical model and allocation model, respectively, and $Final_i$ may represent the number of candidate prediction modes to perform RDO for the block. Furthermore, the symbols "$\lfloor X \rfloor$" and "$\lceil X \rceil$" may represent a flooring function and a ceiling function of X, respectively, and the values of "$\lfloor X \rfloor$" and "$\lceil X \rceil$" may be integers. The number "$Final_i$" hence may be determined on the basis of an ideal mode (the mathematical mode) by taking the resource limitation in practical implementation (the allocation mode) into consideration.

For example, if the values of $Optimal_1$ and $Budget_1$ for a first block are 2.5 and 4.5, respectively, the Rule 1 is satisfied. Consequently, the values of $Final_1$ and $Extra_1$ are 4 and 0.5, respectively. Furthermore, $Budget_2$ is equal to 5 (=4.5+$Extra_1$).

If the value of $Optimal_2$ for a second block immediately following the first block is 4.5, the Rule 2 is satisfied. Consequently, the values of $Final_2$ and $Extra_2$ are 4 and 1, respectively. Furthermore, $Budget_3$ is equal to 5.5 (=4.5+$Extra_2$).

If the value of $Optimal_3$ for a third block immediately following the second block is 6.4, the Rule 3 is satisfied. Consequently, the values of $Final_3$ and $Extra_3$ are 6 and 0, respectively. Furthermore, $Budget_4$ is equal to 4.5 (=4.5+$Extra_3$).

If the value of $Optimal_4$ for a fourth block immediately following the third block is 6.8, the Rule 4 is satisfied. Consequently, the values of $Final_4$ and $Extra_4$ are 5 and 0, respectively.

After coding the current $frame_j$, the values of "Buffer" and "C" may be updated for the next frame $frame_{j+1}$ by equations below.

$$\begin{cases} Buffer = Buffer - Sum_j \\ C = C - M_j \end{cases}$$

wherein $Sum_j$ may be the total number of prediction modes for RDO operations used in the current $frame_j$ and $M_j$ may be the total number of blocks of the $frame_j$.

Figure 4:
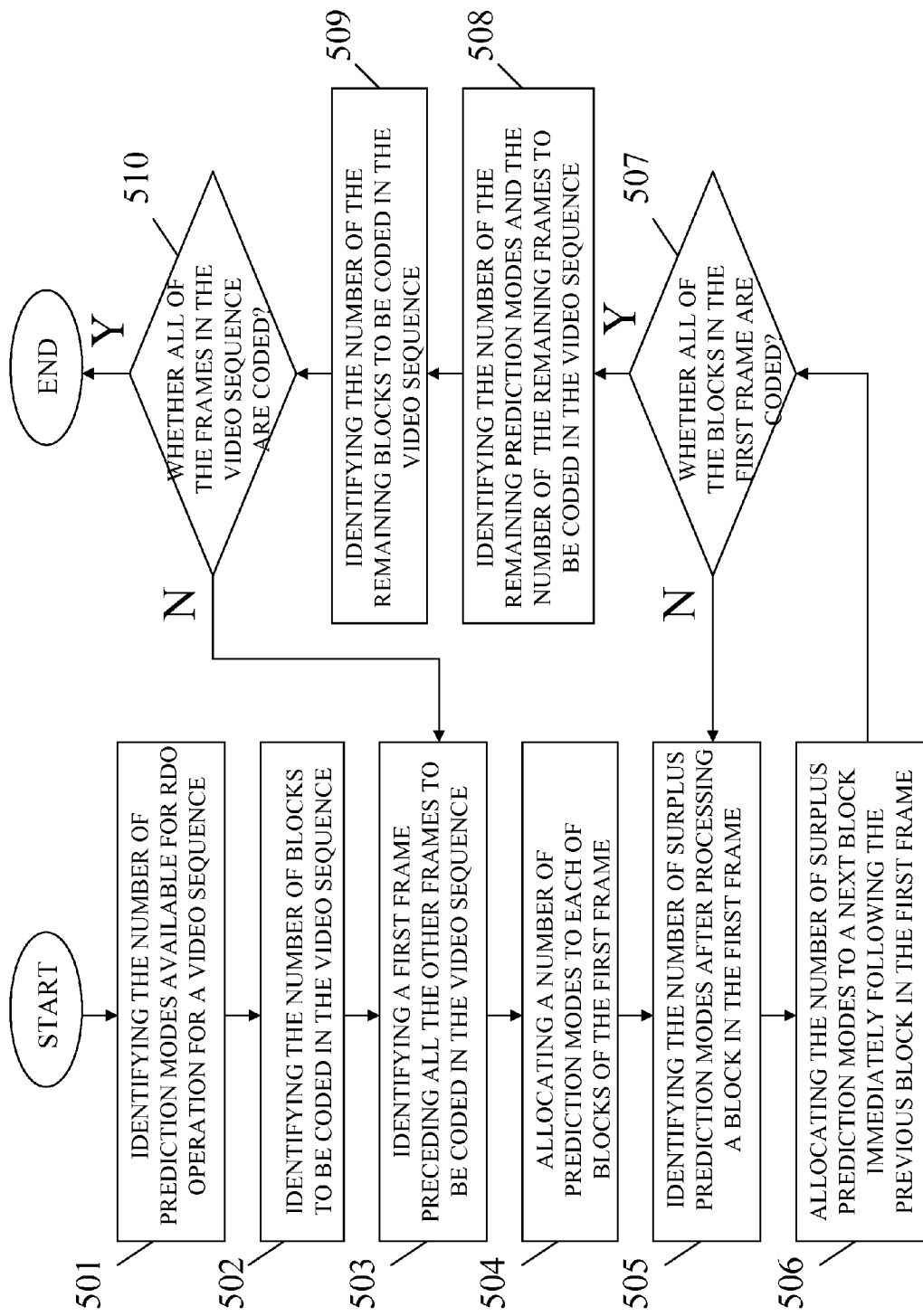
FIG. 4 is a flow diagram illustrating a method of identifying the number of second candidate prediction modes in accordance with an example of the present invention.

FIG. 4 is a flow diagram illustrating a method of identifying the number of second candidate prediction modes in accordance with an example of the present invention. Referring to FIG. 4, the number of prediction modes to perform RDO for a video sequence may be identified at step 501. For example, a ratio of the number of available prediction modes to the total number of prediction modes required for the video sequence may be predetermined. At step 502, the number of blocks to be coded in the video sequence may be identified. Next, at step 503, a first frame preceding all the other frames to be coded in the video sequence may be identified. A number of prediction modes may be allocated to each of blocks of the first frame at step 504. The number of prediction modes may equal "Buffer/C" as previously discussed, which is the same from block to block in the first frame.

Next, at step 505, the number of surplus prediction mode(s) after processing a block in the first frame may be identified. The number may be zero, a positive integer or a decimal. At step 506, the number of the surplus prediction mode(s) may be allocated to a next block immediately following the processed block. At step 507, it may be identified whether all of the blocks in the first frame are coded. If not, the steps 505 and 506 may be repeated. If confirmative, at step 508, the number of the remaining prediction modes and the number of the remaining frames to be coded may be identified. Furthermore, at step 509, the number of the remaining blocks to be coded in the video sequence may be identified. The steps 508 and 509 may determine the number of prediction modes allocated to each of blocks in a second frame, if any, immediately following the first frame. Next, at, step 510, it may be identified whether all of the frames in the video sequence are coded. If not, the steps 503 to 509 may be repeated.

Figure 5:
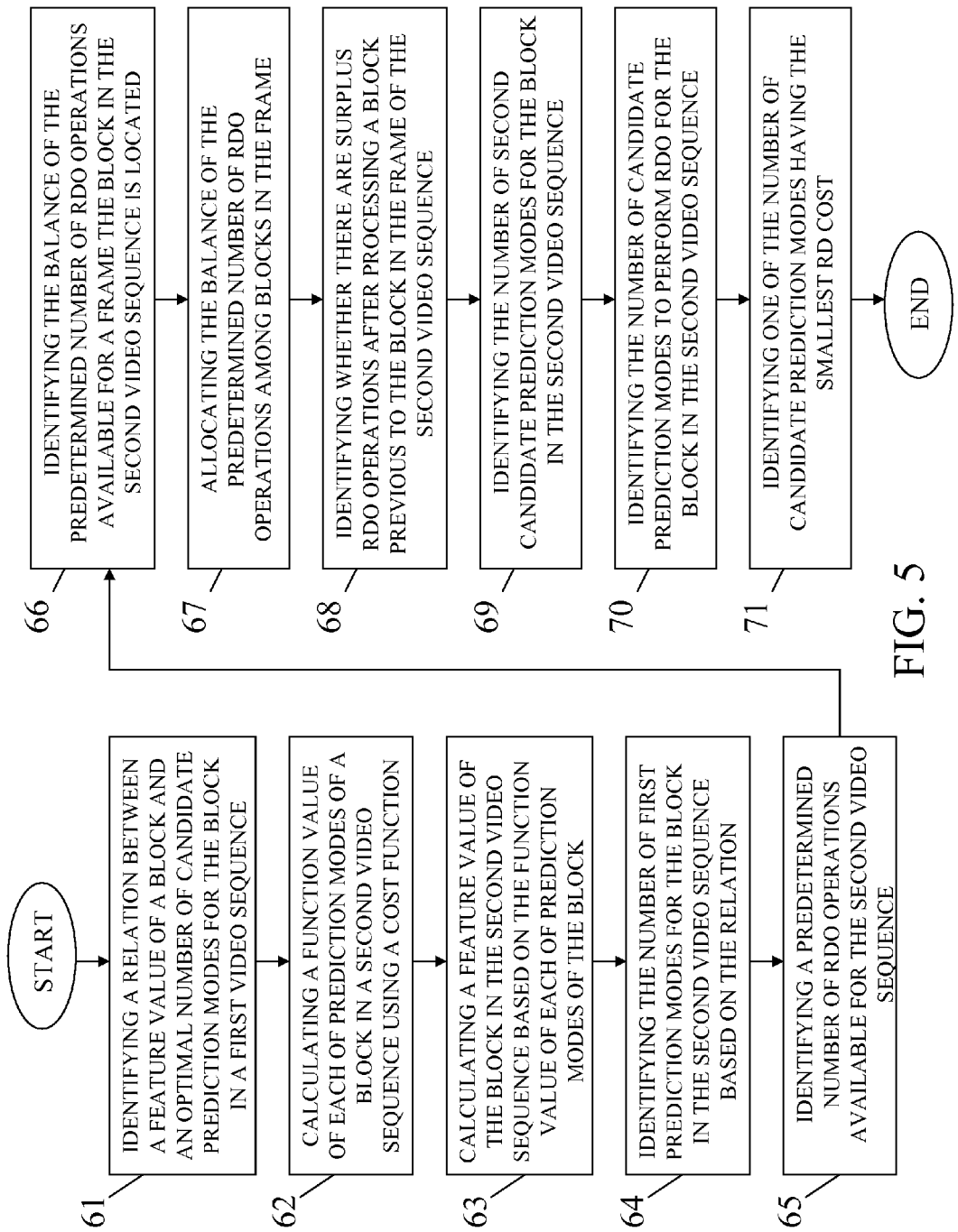
FIG. 5 is a flow diagram illustrating a method of identifying the number of candidate prediction modes in accordance with another example of the present invention.

FIG. 5 is a flow diagram illustrating a method of identifying the number of candidate prediction modes in accordance with another example of the present invention. Referring to FIG. 5, a relation between a feature value of a block and an optimal number of candidate prediction modes for the block in a first video sequence may be identified at step 61. The relation may include but is not limited to that described and illustrated with reference to FIGS. 3B and 3C. At step 62, a function value of each of prediction modes of a block in a second video sequence may be calculated using a cost function such as one of the SAD, SATD, SSD and MAD. The function value of each of the prediction modes of the block may then be used to calculate a feature value of the block in the second video sequence at step 63. At step 64, with the feature value identified at step 63 and the relation established at step 61, the number of first candidate prediction modes for the block in the second video sequence may be identified.

Next, a predetermined number of RDO operations available for the second video sequence may be identified at step 65. The predetermined number of RDO operations may be allocated to frames of the second video sequence one after another. At step 66, the balance of the predetermined number of RDO operations available for a frame the block in the second video sequence is located may be identified. Next, the balance of the predetermined number of RDO operations may be allocated among blocks of the frame at step 67. At step 68, it may be identified whether there are surplus RDO operations after processing a block located immediately previous to the block at issue in the second video sequence. The RDO operations allocated to the block at issue may include a first portion allocated at step 67 and a second portion, if any, from the previous block. At step 69, the number of second candidate prediction modes for the block at issue may be identified. The first and second candidate prediction modes identified respectively at step 64 and step 69 may be compared with each other at step 70 to identify the number of candidate prediction modes to perform the RDO for the block at issue in the second video sequence. Subsequently, at step 71, one of the candidate prediction modes having the smallest RD cost may be identified, which may be used to code the block in the second video sequence.

Figure 6:
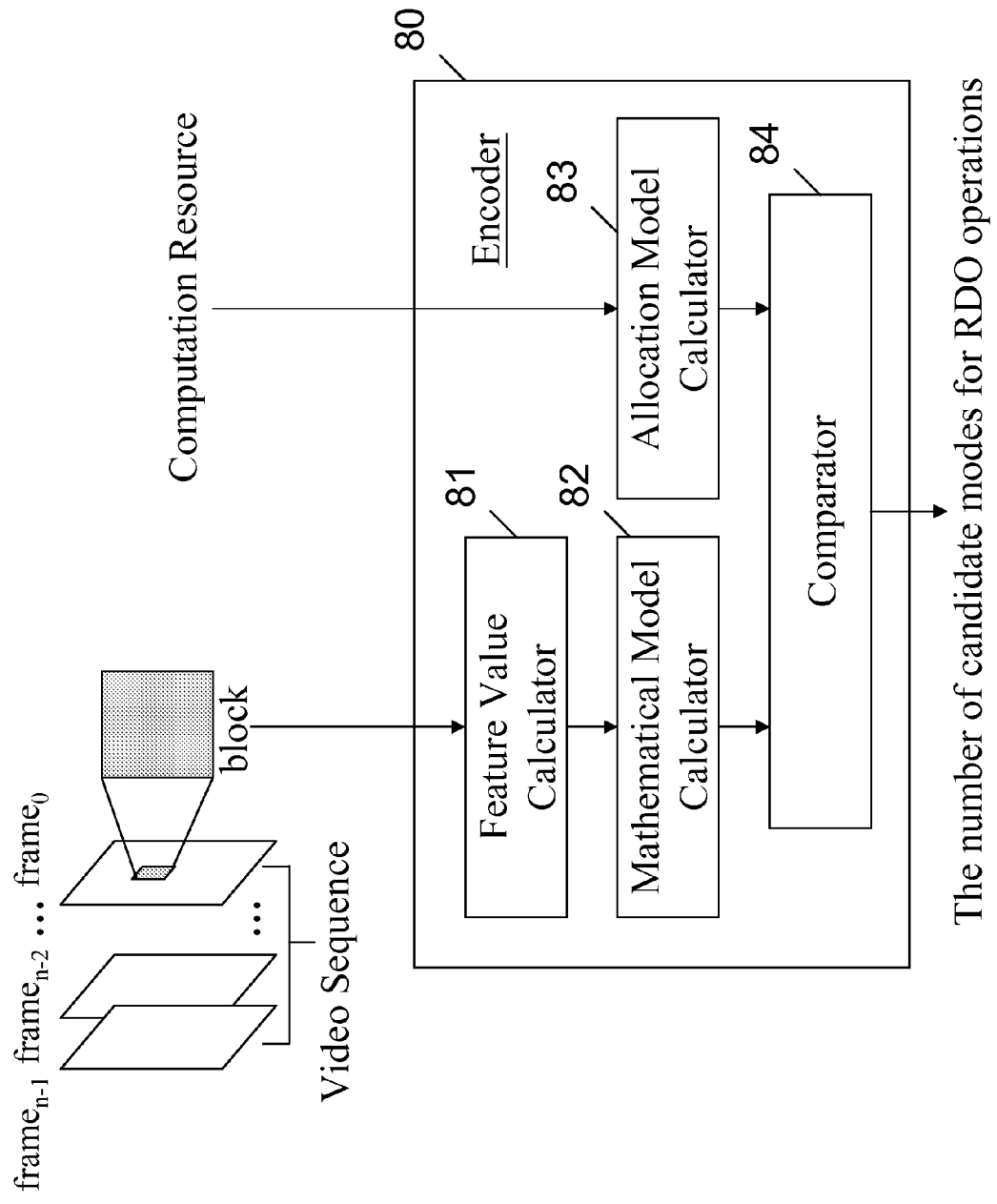
FIG. 6 is a schematic block diagram of an encoder configured to identify the number of candidate prediction modes in accordance with an example of the present invention.

FIG. 6 is a schematic block diagram of an encoder 80 configured to identify the number of candidate prediction modes in accordance with an example of the present invention. Referring to FIG. 6, the encoder 80 may include a feature value calculator 81, a mathematical model calculator 82, an allocation model calculator 83 and a comparator 84. In one example according to the present invention, the encoder 80 may support the functions of an H.264 encoder and may be implemented in hardware or software, in which the former may be more advantageous in view of operation speed while the latter may be more cost effective in view of design complexity. If implemented in hardware, the encoder 80 may be fabricated in an integrated chip (IC). If implemented in software, the encoder 80 may be installed in a personal computer (PC) or a mobile communication device such as a notebook computer, a cell phone and a personal digital assistant (PDA).

The feature value calculator 81 may be configured to calculate a feature value of a first block in a frame in a video sequence comprising, for example, a number of "n" frames, $frame_0$ to $frame_{n-1}$. To calculate the feature value, a function value may be identified using a cost function. The mathematical model calculator 82 may be configured to establish a relation between a feature value of a block and an optimal number of candidate prediction modes for the block. The relation may be established in a similar fashion as described and illustrated with reference to FIG. 3B. Based on the feature value of the first block obtained by the feature value calculator 81, the number of first candidate prediction modes for the first block may be identified.

The allocation model calculator 83 may be configured to allocate a predetermined number of RDO operations to the frames of the video sequence one after another. Furthermore, the RDO operations available for a frame may be allocated among the blocks of the frame so that each of the blocks may be allocated with a first, identical portion. The first portion of RDO operations allocated to a second block located previous to the first block may be compared with the number of first candidate prediction modes for the second block in the comparator 84 in accordance with the Rules 1 to 4 as previously discussed in order to identify whether there are surplus RDO operations. The surplus RDO operations, if any, may be added to the first portion allocated to the first block. The first portion and the surplus portion available for the first block, i.e., the number of second prediction modes, may then be compared with the number of first candidate prediction for the first block in the comparator 84 in order to identify the number of candidate prediction modes for the first block, in addition to whether there are surplus RDO operations for a third block immediately following the first block.

It will be appreciated by those skilled in the art that although in describing the above examples the specification may take the 4×4 block as the examples. However, it will be appreciated by those skilled in the art that the method of the present invention may also be capable of applying to an 8×8 block, 16×16 block or any other possible type of blocks in an H.264 video sequence. Therefore in the type of the block applied in the examples should not be construed as limitations on the claims.

Furthermore, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

We claim:

1. A method of selecting a number of candidate prediction modes for a block in a video sequence, the method comprising:

calculating a cost value of each of prediction modes for each of a predetermined number of blocks, wherein the predetermined number of blocks is a subset of a total number of blocks and wherein the cost value is related to the computational complexity of each of the prediction modes;

identifying one of the prediction modes having the smallest cost value for each of the predetermined number of blocks;

calculating a function value of each of the prediction modes for each of the predetermined number of blocks using a cost function;

ranking the prediction modes for each of the predetermined number of blocks by the function value of each of the prediction modes and identifying an ordinal value of the one prediction mode having the smallest cost value, the ordinal value being related to the ordinal number of the one prediction mode after the ranking;

calculating a feature value of each of the predetermined number of blocks based on the function value of each of the prediction modes related to each of the predetermined number of blocks;

identifying a plurality of sets of blocks, each set of blocks having substantially the same feature value;

identifying the number of each set of blocks and calculating a sum of the ordinal value of the one prediction mode for each of the predetermined number of blocks in the each set of blocks;

calculating an average value of the sum over the number of the each set of blocks for each set of the plurality sets of blocks; and determining a relation between the average values and the feature values for the predetermined number of blocks.

2. The method of claim 1, wherein the cost value includes a rate-distortion (RD) cost for performing a rate-distortion optimization (RDO) operation for the each of the prediction modes.

3. The method of claim 1, wherein the cost function includes a "sum of absolute differences" (SAD) function, a "sum of absolute transformed differences" (SATD) function, a "sum of squared differences" (SSD) function or a "mean of absolute differences" (MAD) function.

4. The method of claim 1, wherein the feature value of each of the predetermined number of blocks is a standard deviation of the function values of the prediction modes related to each of the predetermined number of blocks.

5. The method of claim 1 further comprising expressing the relation between the average values and the feature values in a regression curve.

6. The method of claim 5 further comprising:
calculating a feature value of a block in another video sequence; and
identifying the number of first prediction modes for the block by the regression curve based on the feature value.

7. The method of claim 6 further comprising:
identifying the number of prediction modes available for rate-distortion optimization (RDO) operations for the video sequence;
identifying the number of blocks to be coded in the video sequence;
identifying a first frame preceding all the other frames to be coded in the video sequence; and
allocating a number of prediction modes to each of blocks of the first frame.

8. The method of claim 7 further comprising: identifying the number of surplus prediction modes after processing a first block in the first frame;
allocating the number of surplus prediction modes to a second block immediately following the first block in the first frame; and
determining the number of candidate prediction modes for the second block by comparing the number of first prediction modes with the number of second prediction modes, the number of second prediction modes including the number of prediction modes allocated to the each of blocks of the first frame and the number of surplus prediction modes.

9. The method of claim 8 further comprising:
identifying the number of the remaining prediction modes after processing the first frame;
identifying the number of the remaining frames to be coded in the video sequence; and
identifying the number of the remaining blocks to be coded in the video sequence.

10. An apparatus for selecting a number of candidate prediction modes for a block in a video sequence, the apparatus comprising an encoder configured to at least:
calculate a cost value of each of prediction modes for each of a predetermined number of blocks, wherein the predetermined number of blocks is a total number of subset of the blocks and wherein the cost value is related to the computational complexity of each of the prediction modes;
identify one of the prediction modes having the smallest cost value for each of the predetermined number of blocks;
calculate a function value of each of the prediction modes for each of the predetermined number of blocks using a cost function;
rank the prediction modes for each of the predetermined number of blocks by the function value of each of the prediction modes and identify an ordinal value of the one prediction mode having the smallest cost value, the ordinal value being related to the ordinal number of the one prediction mode after the ranking;
calculate a feature value of each of the predetermined number of blocks based on the function value of each of the prediction modes related to each of the predetermined number of blocks;
identify a plurality of sets of blocks, each set of blocks having substantially the same feature value;
identify the number of each set of blocks and calculating a sum of the ordinal value of the one prediction mode for each of the predetermined number of blocks in the each set of blocks;
calculate an average value of the sum over the number of the each set of blocks for each set of the plurality sets of blocks; and
determine a relation between the average values and the feature values for the predetermined number of blocks, wherein the encoder is implemented in hardware or software, and in an instance in which the encoder is implemented in software, the apparatus further comprises non-transitory computer readable storage medium having the software stored therein.

11. The apparatus of claim 10, wherein the cost value includes a rate-distortion (RD) cost for performing a rate-distortion optimization (RDO) operation for the each of the prediction modes.

12. The apparatus of claim 10, wherein the cost function includes a "sum of absolute differences" (SAD) function, a "sum of absolute transformed differences" (SATD) function, a "sum of squared differences" (SSD) function or a "mean of absolute differences" (MAD) function.

13. The apparatus of claim 10, wherein the feature value of each of the predetermined number of blocks is a standard deviation of the function values of the prediction modes related to each of the predetermined number of blocks.

14. The apparatus of claim 10, wherein the encoder is further configured to express the relation between the average values and the feature values in a regression curve.

15. The apparatus of claim 14, wherein the encoder is further configured to:
calculate a feature value of a block in another video sequence; and
identify the number of first prediction modes for the block by the regression curve based on the feature value.

16. The apparatus of claim 15, wherein the encoder is further configured to:
identify the number of prediction modes available for rate-distortion optimization (RDO) operations for the video sequence;
identify the number of blocks to be coded in the video sequence;
identify a first frame preceding all the other frames to be coded in the video sequence; and
allocate a number of prediction modes to each of blocks of the first frame.

17. The apparatus of claim 16, wherein the encoder is further configured to:
identify the number of surplus prediction modes after processing a first block in the first frame;
allocate the number of surplus prediction modes to a second block immediately following the first block in the first frame; and
determine the number of candidate prediction modes for the second block by comparing the number of first prediction modes with the number of second prediction modes, the number of second prediction modes including the number of prediction modes allocated to the each of blocks of the first frame and the number of surplus prediction modes.

18. The apparatus of claim 17, wherein the encoder is further configured to:
identify the number of the remaining prediction modes after processing the first frame;
identify the number of the remaining frames to be coded in the video sequence; and
identify the number of the remaining blocks to be coded in the video sequence.

* * * * *

UNITED STATES PATENT AND TRADEMARK OFFICE
CERTIFICATE OF CORRECTION

PATENT NO. : 8,467,451 B2
APPLICATION NO. : 11/936779
DATED : June 18, 2013
INVENTOR(S) : Shen et al.

Page 1 of 1

It is certified that error appears in the above-identified patent and that said Letters Patent is hereby corrected as shown below:

In the Claims

Claim 10, Column 13,
Lines 41 and 42, "total number of subset of the blocks" should read --subset of a total number of blocks--.

Signed and Sealed this
Eighth Day of October, 2013

Teresa Stanek Rea
*Deputy Director of the United States Patent and Trademark Office*